United States Patent
Kim et al.

(10) Patent No.: US 8,806,048 B2
(45) Date of Patent: Aug. 12, 2014

(54) METHOD AND APPARATUS FOR TRANSMITTING AND RECEIVING STREAMING DATA BASED ON REAL-TIME STREAMING PROTOCOL (RTSP) SESSION

(75) Inventors: Sung-kee Kim, Hwaseong-si (KR); Dae-hyung Kwon, Seoul (KR); Tae-sung Park, Yongin-si (KR); Gil-yoon Kim, Suwon-si (KR); Chun-bae Park, Suwon-si (KR); Ji-wan Song, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 13/098,740

(22) Filed: May 2, 2011

(65) Prior Publication Data

US 2012/0030314 A1 Feb. 2, 2012

(30) Foreign Application Priority Data

Jul. 29, 2010 (KR) ........................ 10-2010-0073533

(51) Int. Cl.
*G06F 15/16* (2006.01)
*H04L 29/06* (2006.01)

(52) U.S. Cl.
CPC .......... *H04L 65/4084* (2013.01); *H04L 65/608* (2013.01)
USPC ........... 709/231; 709/219; 709/225; 709/227; 709/228; 709/229; 709/236

(58) Field of Classification Search
CPC ............ H04L 29/06027; H04L 65/607; H04L 65/608; H04L 65/4084; H04N 21/2387; H04N 21/47202; H04N 21/2393; H04N 21/2368; H04N 21/6437; H04N 21/8455
USPC .................. 709/219, 225, 227–229, 231, 236
See application file for complete search history.

(56) References Cited

U.S. PATENT DOCUMENTS

| | | | |
|---|---|---|---|
| 2005/0094808 A1* | 5/2005 | Pedlow et al. | 380/200 |
| 2005/0123267 A1* | 6/2005 | Tsumagari et al. | 386/46 |
| 2005/0223107 A1* | 10/2005 | Mine et al. | 709/231 |
| 2008/0010382 A1* | 1/2008 | Ratakonda et al. | 709/231 |
| 2008/0022350 A1* | 1/2008 | Hostyn et al. | 725/139 |
| 2008/0104123 A1* | 5/2008 | Kaneko et al. | 707/104.1 |
| 2008/0216177 A1* | 9/2008 | Yokosato et al. | 726/26 |
| 2009/0037596 A1* | 2/2009 | Math et al. | 709/231 |
| 2009/0138295 A1* | 5/2009 | Deitrich et al. | 705/7 |

(Continued)

FOREIGN PATENT DOCUMENTS

WO 2008003561 A1 1/2008

OTHER PUBLICATIONS

European Search Report issued Aug. 12, 2011 in corresponding European Application No. 11170492.0.

(Continued)

*Primary Examiner* — Alina N Boutah
(74) *Attorney, Agent, or Firm* — Sughrue Mion, PLLC

(57) ABSTRACT

A method and apparatus for receiving streaming data is provided. The method includes establishing a plurality of real-time streaming protocol (RTSP) sessions for receiving the streaming data, and receiving the streaming data through the plurality of RTSP sessions.

24 Claims, 12 Drawing Sheets

(56) References Cited

U.S. PATENT DOCUMENTS

2009/0217328 A1* 8/2009 Colmagro et al. .............. 725/91
2009/0259763 A1* 10/2009 Karlsson ....................... 709/231
2010/0008271 A1* 1/2010 Duan ............................ 370/310
2010/0011402 A1* 1/2010 Oshima ........................ 725/118
2010/0021130 A1* 1/2010 Shiragaki et al. ............... 386/83
2010/0031307 A1* 2/2010 Toyama ........................ 725/131
2010/0064054 A1* 3/2010 Karlsson et al. .............. 709/231

OTHER PUBLICATIONS

H. Schulzrinne, A. Rao Cisco, R. Lanphier, M. Westerlund Ericsson AB, M. Stiemerling(ED), "Real Time Streaming Protocol 2.0 (RTSP)," Music Working Group, Jul. 2, 2010, pp. 1-292, No. 24, Geneva, Switzerland.

Communication dated May 17, 2013 from the European Patent Office in counterpart application No. 11170492.0.

* cited by examiner

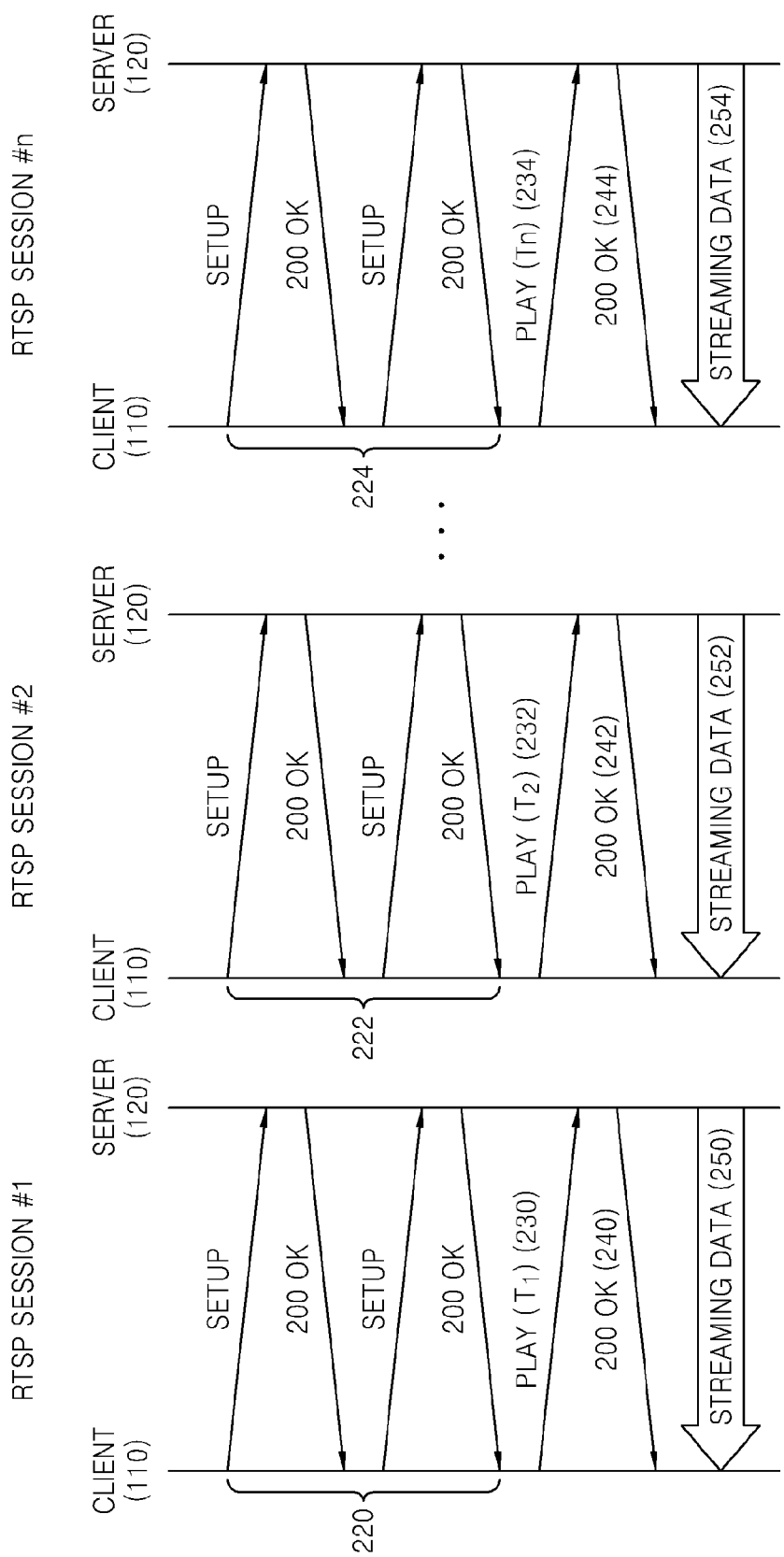

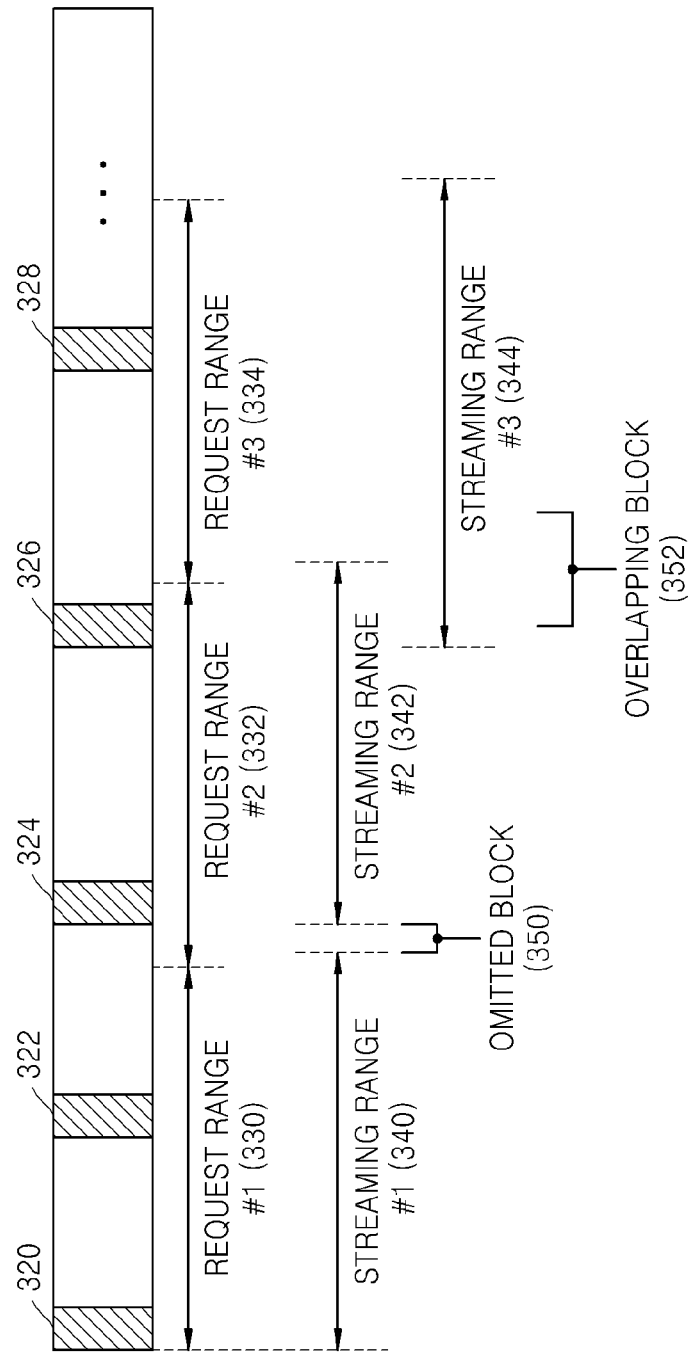

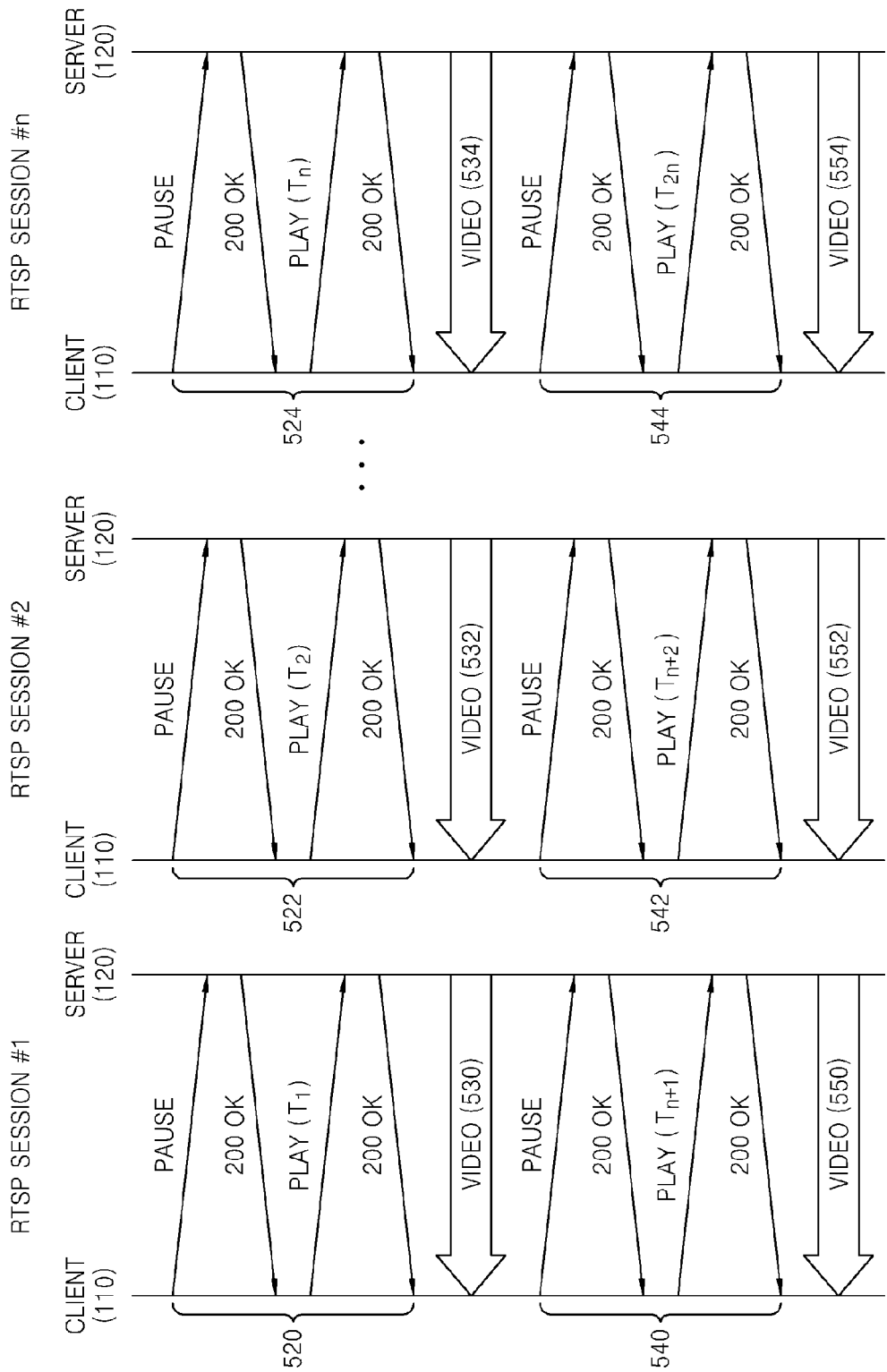

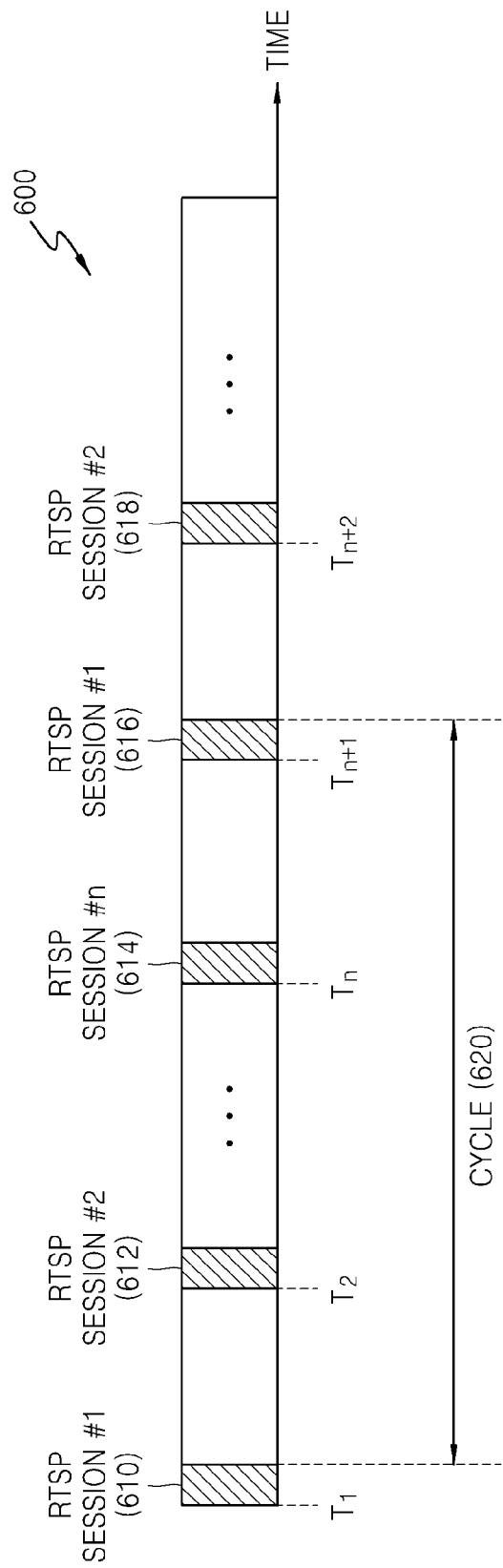

METHOD AND APPARATUS FOR TRANSMITTING AND RECEIVING STREAMING DATA BASED ON REAL-TIME STREAMING PROTOCOL (RTSP) SESSION

CROSS-REFERENCE TO RELATED PATENT APPLICATION

This application claims priority from Korean Patent Application No. 10-2010-0073533, filed on Jul. 29, 2010, in the Korean Intellectual Property Office, the disclosure of which is incorporated herein in its entirety by reference.

BACKGROUND

1. Field

Methods and apparatuses consistent with the exemplary embodiments relate to methods and apparatuses for transmitting and receiving streaming data, and more particularly, to a method and apparatus for transmitting and receiving streaming data based on a real-time streaming protocol (RTSP) session.

2. Description of the Related Art

A real-time streaming protocol (RTSP) is a protocol standardized by the Internal Engineering Task Force (IETF) to transmit and receive multimedia data, such as video and audio data, in real-time. The RTSP is a protocol used when streaming data is transmitted and received by remotely controlling a server for providing media data, and is used to remotely perform a control operation, such as "Play" or "Pause".

A real-time transport protocol (RTP) is used together with the RTSP to transmit and receive the media data. The RTP is a protocol used when real-time multimedia data is transmitted, and packet loss or a sequence of the media data may be detected by using information, such as a timestamp and a sequence number, included in an RTP packet header.

SUMMARY

The exemplary embodiments provide a method and apparatus for transmitting and receiving streaming data, and a computer readable recording medium having embodied thereon a program for executing the method.

According to an aspect of the exemplary embodiments, there is provided a method of receiving streaming data from a server, wherein the method is performed by a client, the method including: establishing a plurality of real-time streaming protocol (RTSP) sessions for receiving the streaming data; requesting the streaming data through the plurality of RTSP sessions; and receiving the streaming data through the plurality of RTSP sessions in response to the request.

The plurality of RTSP sessions may be for receiving different parts of the streaming data.

The requesting may include requesting transmission of the streaming data by setting a plurality of reproduction starting times.

The plurality of reproduction starting times may be within a predetermined time range from an initial reproduction starting time of the streaming data.

The receiving may include receiving parts of the streaming data that are classified according to a plurality of random access times each corresponding to the plurality of reproduction starting times.

An RTSP session for receiving a part of the streaming data that starts at a first random access time from among the parts of the streaming data that are classified according to the plurality of random access times may be ended at a second random access time following the first random access time.

The plurality of random access times may correspond to a random accessible video frame or audio frame.

According to an aspect of the exemplary embodiments, timestamps and real-time transport protocol (RTP) sequence numbers of the parts of the streaming data that are classified according to the plurality of random access times, are adjusted to consecutive timestamps and RTP sequence numbers.

The requesting may include requesting transmission of parts of the streaming data corresponding to intra image frames (I image frames) having different random access times times.

The I image frames having different random access times may have predetermined time intervals.

The receiving may include receiving parts of the streaming data pertaining to I image frames having different random access times each corresponding to the different times in the predetermined time intervals.

The requesting may include repeatedly requesting transmission of parts of the streaming data pertaining to I image frames having different random access times according to a predetermined requesting cycle.

The plurality of RTSP sessions may include a session for reproducing the streaming data, and a session for seeking a plurality of frames of the streaming data in a predetermined time interval.

According to another aspect of the exemplary embodiments, there is provided an apparatus for receiving streaming data from a server, wherein the apparatus is included in a client, the apparatus including: a session manager for establishing a plurality of real-time streaming protocol (RTSP) sessions for receiving the streaming data, and requesting the streaming data through the plurality of RTSP sessions; and a data manager for receiving the streaming data through the plurality of RTSP sessions in response to the request.

According to another aspect of the exemplary embodiments, there is provided a computer readable recording medium having recorded thereon a program for executing the method.

BRIEF DESCRIPTION OF THE DRAWINGS

The above and other aspects will become more apparent by describing in detail exemplary embodiments thereof with reference to the attached drawings in which:

FIGS. 2A and 2B are diagrams of an RTSP session for receiving different parts of streaming data, according to an exemplary embodiment;

FIGS. 3A and 3B are diagrams for describing a difference between a time when transmission is requested and a time of actual streaming, according to an exemplary embodiment;

FIGS. 5A and 5B are diagrams of a plurality of RTSP sessions for receiving different parts of streaming data for multiple-speed reproduction, according to an exemplary embodiment;

FIG. 6 is a diagram of streaming data including key frames, according to an exemplary embodiment;

DETAILED DESCRIPTION OF THE EXEMPLARY EMBODIMENTS

Hereinafter, the inventive concept will be described more fully with reference to the accompanying drawings, in which exemplary embodiments are shown.

Figure 1:
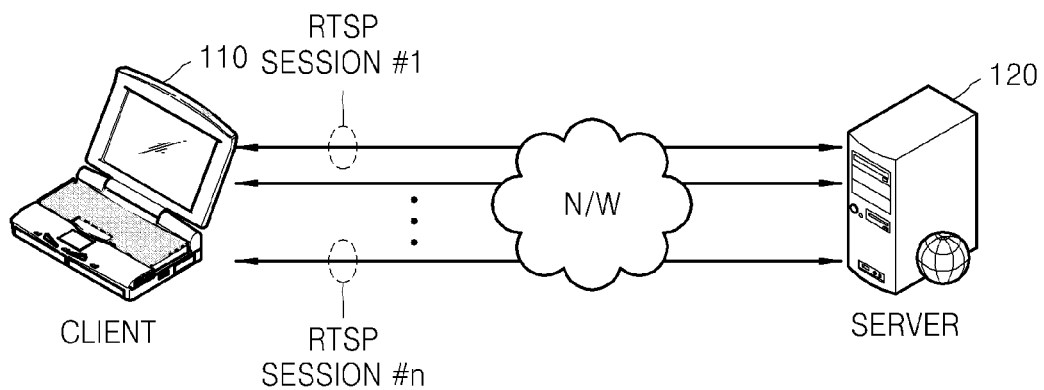
FIG. 1 is a diagram of a plurality of real-time streaming protocol (RTSP) sessions, according to an exemplary embodiment.

FIG. 1 is a diagram of a plurality of real-time streaming protocol (RTSP) sessions, according to an exemplary embodiment.

Generally, a server 120, which transmits streaming data to a client 110 through an RTSP session, transmits streaming data at the same speed as a reproduction speed of the streaming data through one RTSP session. In other words, one piece of streaming data, i.e., streaming data related to one item of content, is transmitted to the client 110 at the same speed as the reproduction speed through one RTSP session.

However, according to a method of transmitting and receiving streaming data, according to an exemplary embodiment, a plurality of RTSP sessions are used to transmit and receive streaming data, instead of one RTSP session, so that the streaming data is quickly transmitted and received. Referring to FIG. 1, the client 110 and the server 120 may establish n RTSP sessions from RTSP session #1 through RTSP session #n so as to transmit and receive one piece of streaming data, and receive the one piece of streaming data through the established n RTSP sessions.

Different parts of the streaming data may be transmitted and received through the n RTSP sessions, or different functions of a streaming service may be performed through the n RTSP sessions. For example, the streaming data may be classified into n different parts based on time, and the n different parts may be simultaneously received through the n RTSP sessions. Alternatively, the streaming data may be reproduced through the RTSP session #1, and the same streaming data may be sought through the RTSP session #2, thereby performing different functions of the streaming service through the plurality of RTSP sessions. Various methods of transmitting and receiving streaming data based on a plurality of RTSP sessions will now be described in detail.

Figure 2A:
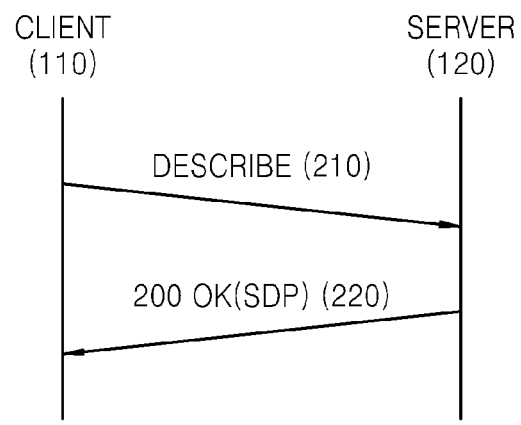

FIGS. 2A and 2B are diagrams of an RTSP session for receiving different parts of streaming data, according to an exemplary embodiment.

Referring to FIG. 2A, the client 110 transmits a DESCRIBE message through one RTSP session, in operation 210. The DESCRIBE message is a message requesting a description about streaming data to be received by the client 110.

In operation 220, the server 120 transmits a 200 OK message in response to the DESCRIBE message. The 200 OK message may include the description about the streaming data requested by the client 110 in operation 210. The 200 OK message may include a description about streaming data generated according to a session description protocol (SDP). A detail, an address, and metadata of multimedia data requested according to the DESCRIBE message may be included in the 200 OK message as the description about the streaming data.

Since a method of transmitting and receiving streaming data, according to an exemplary embodiment is about transmitting and receiving different parts of one piece of streaming data, instead of transmitting and receiving streaming data about different items of content, through the plurality of RTSP sessions, the transmitting of the DESCRIBE message of operation 210 and the receiving of the 200 OK message of operation 220 are performed once through one RTSP session.

Referring to FIG. 2B, the client 110 receives the different parts of the streaming data through the n RTSP sessions. In operations 220, 222, and 224, sessions for transmitting and receiving streaming data are set up. When the streaming data includes video data and audio data, a setup for transmitting and receiving the video data, and a setup for transmitting and receiving the audio data are performed as shown in FIG. 2B.

In operations 230, 232, and 234, the client 110 requests transmission of the different parts of the streaming data through the n RTSP sessions. The transmission of the streaming data is requested by setting up different reproduction starting times $T_1$ through $T_n$. A PLAY message, in which the different reproduction starting times are set up, may be transmitted to the server 120 through the plurality of RTSP sessions.

The client 110 receives a response message regarding the requests, in operations 240, 242, and 244, and receives the different parts of the streaming data in operations 250, 252, and 254. Since different reproduction starting times are set up, the different parts of the streaming data are simultaneously transmitted and received through the n RTSP sessions.

The streaming data from the time $T_1$ to the time $T_2$ may be transmitted and received through the RTSP session #1, and the streaming data from the time $T_2$ to the time $T_3$ may be transmitted and received through the RTSP session #2. Also, for example, the streaming data from the time $T_{n-1}$ to the time $T_n$ may be received through the RTSP session #n.

The reproduction starting times that are set up while requesting the transmission of the streaming data in operations 230, 232, and 234 may be different from an actual starting time of the streaming data received in operations 250, 252, and 254. Such a difference will now be described in detail with reference to FIGS. 3A and 3B.

Figure 3A:
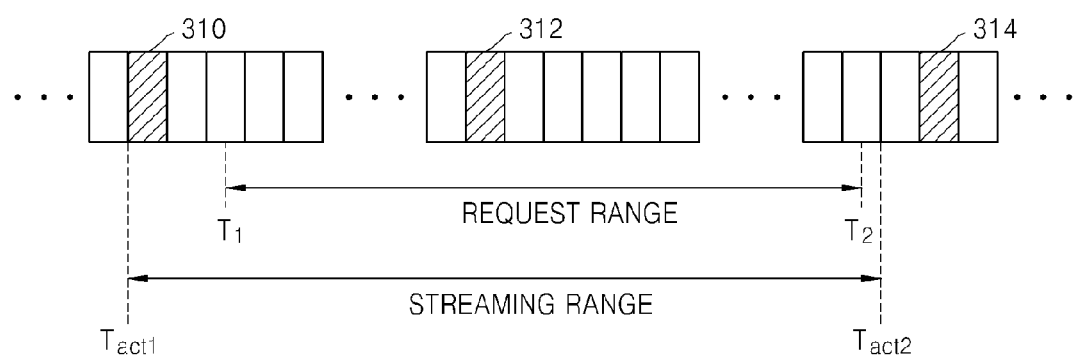

FIGS. 3A and 3B are diagrams for describing a difference between a time when transmission is requested and a time of actual streaming, according to an exemplary embodiment.

Referring to FIG. 3A, the client 110 requests the transmission of the streaming data from the time $T_1$ to the time $T_2$ through one of the plurality of RTSP sessions. However, actual starting and ending times of the streaming data may respectively be a time $T_{act1}$ and a time $T_{act2}$, which are different from the times $T_1$ and $T_2$. With respect to the request of the client 110 to transmit the streaming data, the server 120 may select streaming starting and ending times that are different from the requested reproduction starting and ending times. Such a difference is generated due to at least one of a random access point and a difference between a time when the streaming is requested and an actual frame time.

A difference between the time $T_1$ and the time $T_{act1}$ may be generated by a random access point. For example when video data that is compressed by a predetermined codec is randomly accessed, the video data includes key frames 310 through 314, such as intra frames (I frames) having predetermined cycles, which are necessarily decoded. Accordingly, the server 120 may set up the key frames 310 through 314 as random access points, and set up the random access points as the starting times of the streaming data so as to transmit the streaming data. In other words, even if the client 110 requests the server 120 to start streaming from the time $T_1$, the server 120 may transmit the streaming data corresponding to a time of the random access point corresponding to the time $T_1$, i.e., the time $T_{act1}$ constituting the random access time. The time $T_{act1}$ corresponding to the time $T_1$ may be determined to be a time of an I image frame nearest to the time $T_1$. Since the client 110 that requests the transmission of the streaming data is unaware of the random access points of the streaming data, the time $T_1$ and the time $T_{act1}$ may be different from each other.

A difference between the time $T_2$ and the time $T_{act2}$ is generated due to a difference between a requested time and an actual frame time. For example, even when the client 110 requests the transmission of the streaming data by setting up the encoding time of the streaming data, i.e., the time $T_2$, to be 12.5 seconds, if a frame corresponding to the time $T_2$ does not exist, the server 120 may transmit the streaming data corresponding to 12.6 seconds that corresponds to an actual frame or corresponding to a frame of 12.6 seconds to the client 110.

Due to the random access point and the difference between the requested time and the actual frame time, an omitted block 350 or an overlapping block 352 may be generated as shown in FIG. 3B, when the different parts of the streaming data are received through the plurality of RTSP sessions.

For example, it is assumed that the client 110 requests the server 120 to transmit a request range #1 330 through the RTSP session #1, to transmit a request range #2 332 through the RTSP session #2, and to transmit a request range #3 334 through the RTSP session #3. Here, the request ranges #1 through #3 330 through 334, which are requested by the client 110 to the server 120, are consecutive parts of the streaming data without an omitted or overlapping block. However, streaming ranges #1 through #3 340 through 344 that are actually transmitted from the server 120 to the client 110 are not identical to the request ranges #1 through #3 330 through 334, and thus the omitted block 350 or the overlapping block 352 is generated. Such a discordance between the request ranges #1 through #3 330 through 334 and the streaming ranges #1 through #3 340 through 334 occurs due to the key frames 320 through 328 constituting the random access points or the difference between the requested time and the actual frame time, as described above.

Figure 4:
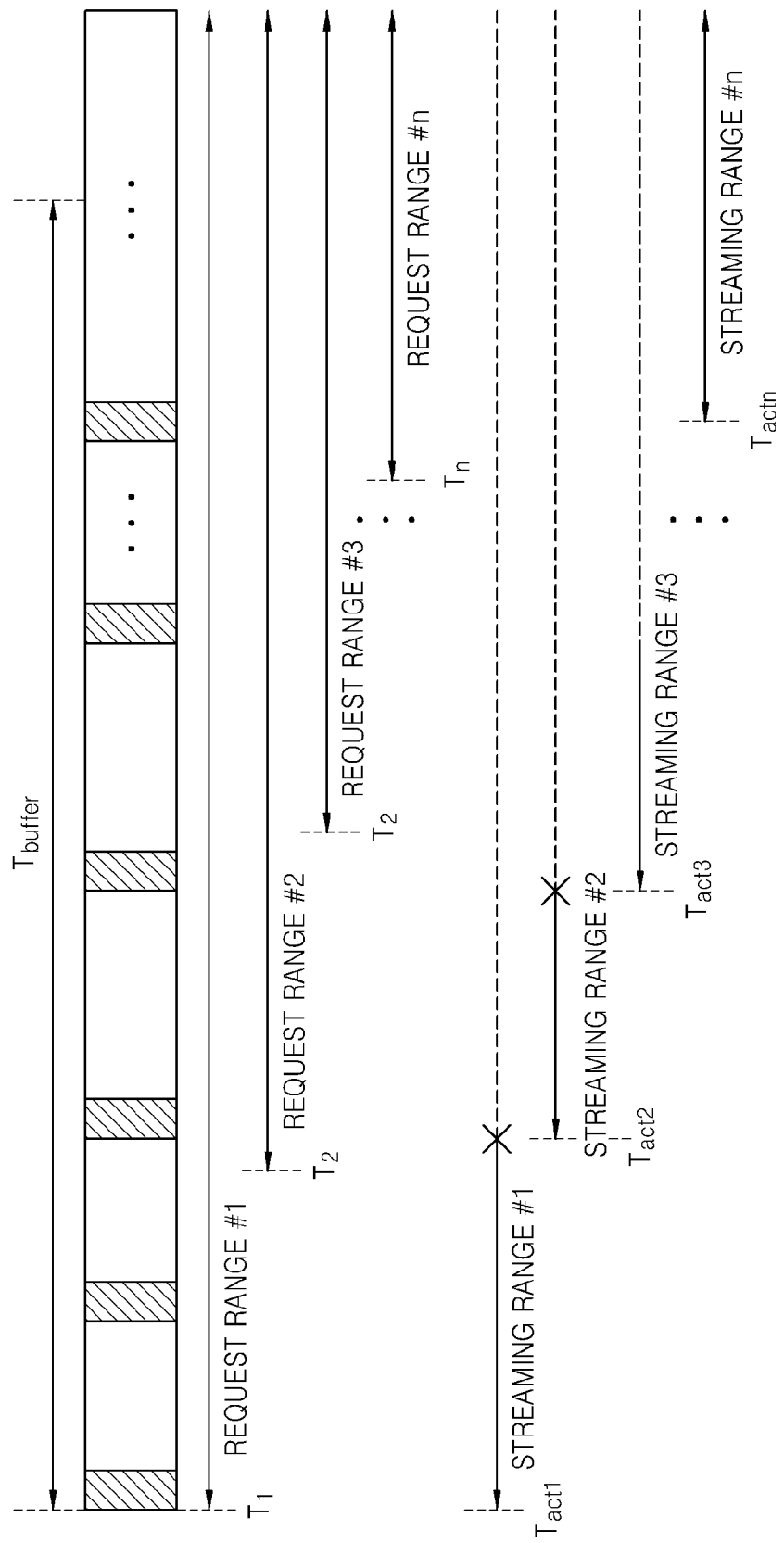
FIG. 4 is a diagram for describing a method of receiving different parts of streaming data through a plurality of RTSP sessions, according to an exemplary embodiment.

FIG. 4 is a diagram for describing a method of receiving the different parts of the streaming data through the plurality of RTSP sessions, according to an exemplary embodiment.

As described with reference to FIGS. 3A and 3B, when the different parts of the streaming data are received through the plurality of RTSP sessions, the omitted block 350 and the overlapping block 352 may be generated. Accordingly, the method according to the current exemplary embodiment may be performed as follows.

Referring to FIG. 4, the client 110 requests transmission of the streaming data from the time $T_1$ through the RTSP session #1, and requests transmission of the streaming data from the time $T_2$ through the RTSP session #2. For example, the client 110 requests transmission of the streaming data from the time $T_n$ through the RTSP session #n. The omitted block 350 may be prevented from being generated by requesting the streaming data by only setting up a reproduction starting time and not assigning an encoding time of a request range. In other words, a starting time of a request range #n may be set up to be $T_n$, and an ending time of the request range #n may not be set up when the transmission of the streaming data is requested.

When the transmission of the streaming data is requested through the plurality of RTSP sessions by setting up the reproduction starting times, the streaming data is actually transmitted based on random access times, instead of the reproduction starting times. In other words, the streaming data is transmitted through the plurality of RTSP sessions from the time $T_{act1}$ to the time $T_{actn}$.

When the client 110 receives the streaming data from the times $T_{act1}$ to $T_{actn}$ through the plurality of RTSP sessions, an overlapping block may be received. In other words, when the streaming data is received from the time $T_{act1}$ through the RTSP session #1, the streaming data overlaps with the RTSP session #2 after time $T_{act2}$. Since the different parts of the streaming data are simultaneously received through the plurality of RTSP sessions, the streaming data received after the time $T_{act2}$ is already received by the client 110. Accordingly, if the streaming data after the time $T_{act2}$ is repeatedly received through the RTSP session #1, a bandwidth may be inefficiently used.

Accordingly, the client 110 ends an RTSP session, which receives streaming data starting at a first random access time, at a second random access time following the first random access time. For example, the RTSP session #1, which receives the streaming data from the time $T_{act1}$, is ended at the time $T_{act2}$ following the time $T_{act1}$, and the RTSP session #2, which receives the streaming data from the time $T_{act2}$, is ended at the time $T_{act3}$ following the time $T_{act2}$. By repeating the ending of such RTSP sessions, the inefficiency of repeatedly receiving the streaming data through the plurality of RTSP sessions may be prevented.

As a result, the client 110 receives a streaming range #1 from among the streaming data through the RTSP session #1, and receives a streaming range #2 from among the streaming data through the RTSP session #2. The client 110 receives each of the parts of the streaming data classified by a plurality of random access times through the plurality of RTSP sessions, and thus quickly receives the streaming data.

Upon receiving the different parts of the streaming data through the plurality of RTSP sessions, the client 110 modifies time information so as to consecutively reproduce the different parts as one piece of streaming data. In streaming based on an RTSP session, the streaming data is packetized, transmitted, and received generally based on a real-time transport protocol (RTP). However, according to the RTP, random timestamps and RTP sequence numbers are used for each session. Accordingly, the plurality of RTSP sessions have different timestamps and RTS sequence numbers. Thus, the client 110 modifies non-consecutive timestamps and sequence numbers of different parts of the streaming data received through the plurality of RTSP sessions into consecutive timestamps and sequence numbers, and stores the consecutive timestamps and sequence numbers in a buffer. Accordingly, the streaming data may be continuously reproduced.

The method shown in FIG. 4 may be applied only during an initial reproduction of the streaming data. In other words, the plurality of reproduction starting times that are set up while requesting the different parts of the streaming data may be a plurality of times within a predetermined time range from an initial reproduction starting time of the streaming data. In order to reduce time consumed for buffering during the initial reproduction of the streaming data, the streaming data may be quickly received through the plurality of RTSP sessions, for example from the RTSP sessions #1 through #n−1, and then may be received at the same speed as a reproduction speed through one RTSP session, for example, the RTSP session #n after the buffering.

Referring to the method of FIG. 4, the plurality of reproduction starting times, i.e., the times $T_1$ through $T_n$, are determined within the predetermined time range from the initial reproduction starting time of the streaming data, i.e., from the time $T_1$ to the time $T_{buffer}$, and the streaming data may be quickly buffered by requesting and receiving the different parts of the streaming data based on the times $T_1$ through $T_n$.

Figure 5A:
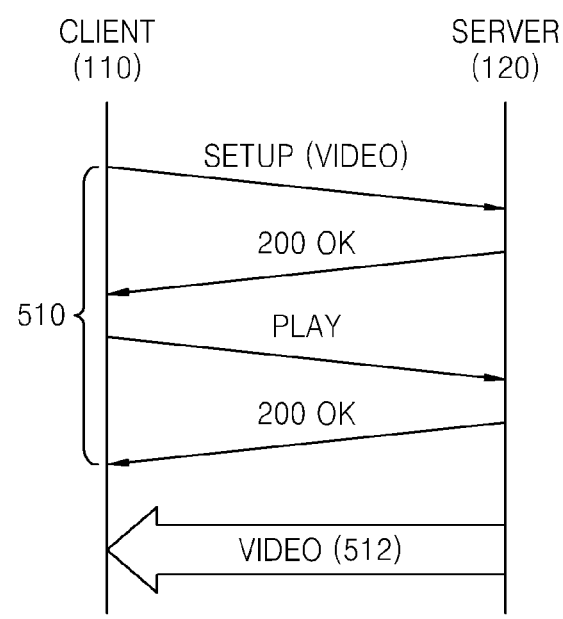

FIGS. 5A and 5B are diagrams of a plurality of RTSP sessions for receiving different parts of streaming data for multiple-speed reproduction, according to an exemplary embodiment. FIGS. 5A and 5B are diagrams for describing a method of quickly receiving streaming data through the plurality of RTSP sessions so as to reproduce the streaming data in a multiple-speed.

The method of FIGS. 5A and 5B are identical to the method of FIGS. 2A and 2B, except that the method of FIGS. 5A and 5B quickly receives only data corresponding to an I image frame from among the streaming data through the plurality of RTSP sessions.

The client 110 transmits a DESCRIBE message to the server 120 through one RTSP session as described above with reference to FIG. 2A. The client receives a description about streaming data generated according to an SDP in response to the DESCRIBE message. Then, the client 110 sets up the plurality of RTSP sessions by sharing the description about the streaming message received through one RTSP session.

FIG. 5A is a diagram for describing a method of establishing a RTSP session for reproducing streaming data at a multiple-speed, according to an exemplary embodiment. When the streaming data is reproduced at the multiple-speed without reproduction of audio data, a setup for receiving the audio data is not required. Accordingly, the client 110 requests a set up of an RTSP session for transmitting and receiving video data, and receives a 200 OK message in response to the request, in operation 510. Upon receiving the 200 OK message, the client 110 requests the server 120 to transmit the streaming data, and receives the video data in operation 512 in response to the request.

FIG. 5B requests the plurality of RTSP sessions for reproducing the streaming data at the multiple-speed.

Referring to FIG. 5B, the client 110 pauses the plurality of RTSP sessions in operations 520, 522, and 524, and requests the server 120 to transmit the streaming data of times $T_1$ through $T_n$. Operations 520, 522, and 524 will now be described in detail with reference to FIG. 6

FIG. 6 is a diagram of streaming data 600 including key frames, according to an exemplary embodiment.

Referring to FIG. 6, the streaming data 600 includes I image frames 610 through 618 at predetermined time intervals. Here, an I image frame is a frame that is prediction-encoded by using intra prediction for removing redundancy between adjacent pixels in the I image frame, and does not require referring to another frame for encoding and decoding. When the streaming data is reproduced at a multiple-speed, only the I image frames 610 through 618 are received, quickly decoded, and reproduced thereby reproducing the streaming data at the multiple-speed.

However, when the I image frames 610 through 618 are received through one RTSP session, pause and reproduction are repeated, and thus multiple-speed reproduction may not be smoothly performed. In other words, when the multiple-speed reproduction is performed through one RTSP session, the client 110 reproduces the I image frame 610 of the time $T_1$, pauses the reproduction of the I image frame 610 by transmitting a PAUSE message to the server 120, reproduces the I image frame 612 of the time $T_2$, and then transmits the PAUSE message again to the server 120. Such repeated transmissions of PAUSE and PLAY messages are not suitable for the multiple-speed reproduction, wherein the streaming data is quickly reproduced.

Accordingly, a method of transmitting and receiving streaming data, according to an exemplary embodiment, includes receiving different I image frames by using a plurality of RTSP sessions. For example, streaming data corresponding to I image frames from a time $T_1$ to a time $T_n$ are respectively received through RTSP session #1 to RTSP session #n, and then streaming data corresponding to I image frames from a time $T_{n+1}$ to a time $T_{2n}$ are respectively received through the RTSP session #1 to RTSP session #n.

Referring to FIG. 6, data about the I image frames 610 through 618 are repeatedly requested and received through the plurality of RTSP sessions for a predetermined request cycle 620, and thus the data about the I image frames 610 through 618 are quickly received.

Referring back to FIG. 5B, the client 110 requests parts of streaming data each corresponding to I image frames of different times to the server 120 through the plurality of RTSP sessions in operations 520, 522, and 524, and receives the requested parts of the streaming data in operations 530, 532, and 534. The client 110 receives packets corresponding to the parts of the streaming data.

If reproduction starting times, i.e., the times $T_1$ through $T_n$, requested by the client 110 do not correspond to the times of the I image frames, the server 120 may transmit parts of the streaming data corresponding to the I image frames nearest to the requested reproduction starting times, i.e., parts of the streaming data corresponding to the I image frames of random access times nearest to the requested reproduction starting times, to the client 110. Also, the I image frames received in operations 530, 532, and 534 may be the I image frames included in the predetermined required cycle 620 as shown in FIG. 6.

When the parts of the streaming data corresponding to the I image frames of different times are received through the plurality of RTSP sessions, the server 120 is requested to transmit parts of the streaming data corresponding to I image frames of a following cycle, i.e. the I image frames of times from $T_{n+1}$ to $T_{2n}$ in operations 540, 542, and 544, and then the requested parts of the streaming data are transmitted to the client 110. It is determined whether all packets corresponding to the I image frames of the different times are received in operations 530, 532, and 534, and if all packets are received, operations 540 through 554 are performed.

Like operations 530, 532, and 534, when the times $T_{n+1}$ to $T_{2n}$ requested by the client 110 do not correspond to the times of the I image frames, the server 120 may transmit parts of the streaming data corresponding to the I image frames of the random access times nearest to the requested times $T_{n+1}$ to $T_{2n}$ to the client 110.

Since the I image frames are repeatedly requested and received in a predetermined request cycle through the plurality of RTSP sessions as shown in FIG. 5B, the multiple-speed reproduction may be smoothly performed as the I image frames 610 through 618 are received n times quicker than when the I image frames 610 and 618 are requested and received through a single RTSP session.

As described with reference to FIG. 4, since timestamps and sequence numbers of the streaming data about the I image frames received through the plurality of RTSP sessions in operations 530, 532, 534, 550, 552, and 554 are non-consecutive, the non-consecutive timestamps and sequence numbers are modified based on multiple-speed information or the like, and then stored and reproduced with the streaming data about the I image frames.

Figure 7:
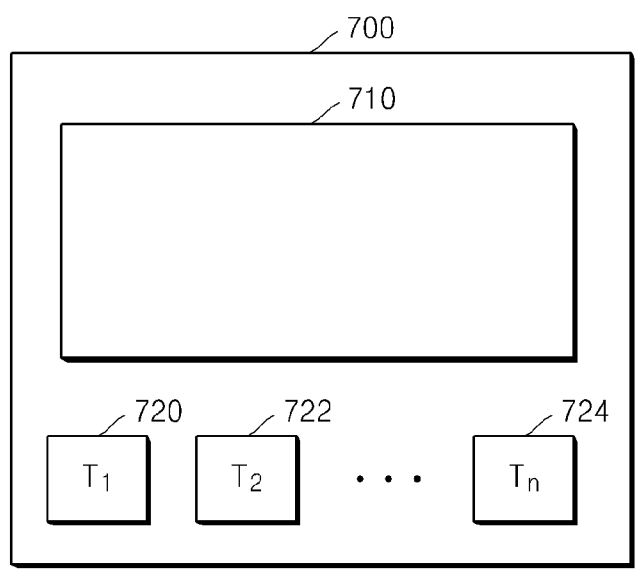
FIG. 7 is a diagram of a screen including thumbnail images, according to an exemplary embodiment.

FIG. 7 is a diagram of a screen 700 including thumbnail images 720 through 724, according to an exemplary embodiment.

Referring to FIG. 7, quick transmission and reception of streaming data by using a plurality of RTSP sessions, according to an exemplary embodiment, may be used to display a thumbnail image.

In other words, the thumbnail images 720 through 724 may be displayed at a predetermined time interval while reproducing video data on the screen 700. The video data is displayed to a user through a main screen 710, and the thumbnail images 720 through 724 is displayed at the predetermined time intervals may also be displayed with the video data for convenience when seeking to display a certain scene. Here, the thumbnail images 720 through 724 may be received based on the streaming data being sought, and if reproduction of the streaming data and searching of the thumbnail images 720 through 724 are simultaneously performed through a single RTSP session, the reproduction of the streaming data may be interrupted and the searching of the thumbnail images 720 through 724 may be performed too slowly. Thus, the thumbnail images 720 through 724 may be displayed to the user after too much time has passed after the reproduction of the streaming data.

Accordingly, a plurality of RTSP sessions according to an exemplary embodiment may perform different functions of a streaming service. In other words, the client 110 and the server 120 may establish two RTSP sessions, and the streaming data may be reproduced through an RTSP session #1 and a thumbnail image of the same streaming data may be received through an RTSP session #2.

Figure 8:
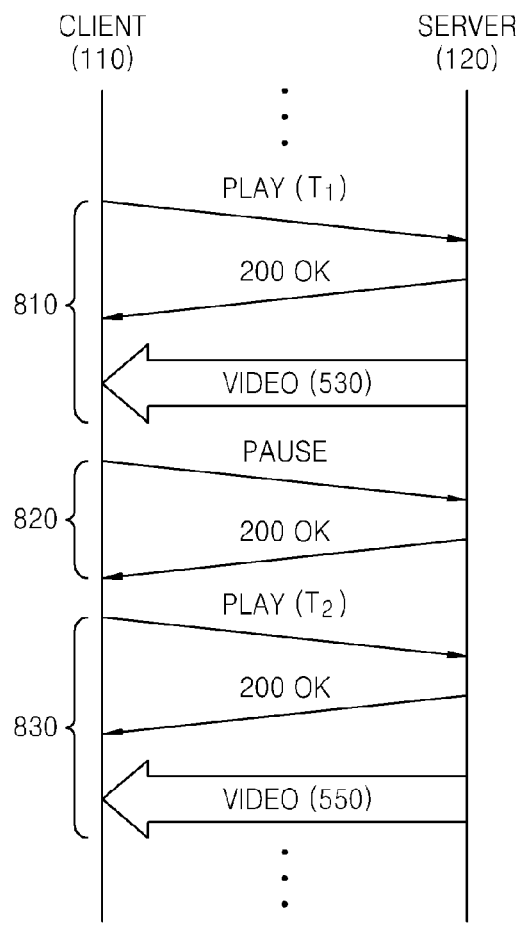
FIG. 8 is a diagram of an RTSP session for receiving a thumbnail image, according to an exemplary embodiment.

FIG. 8 is a diagram of an RTSP session for receiving a thumbnail image, according to an exemplary embodiment.

As described with reference to FIG. 2A, the client 110 transmits a DESCRIBE message to the server 120 through one RTSP session. The client 110 receives a description about streaming data generated according to an SDP in response to the DESCRIBE message. Then, the client 110 shares the description about the streaming data received through one RTSP session so as to establish an RTSP session for reproducing the streaming data and an RTSP session for receiving a thumbnail image.

Like the RTSP session for reproducing the streaming data at a multiple-speed as shown in FIG. 5A, the RTSP session for receiving the thumbnail image is not required to be set up to receive audio data. The client 110 requests the server 120 to set up an RTSP session for transmitting and receiving video data, and receives a 200 OK message in response to the request.

Upon receiving the 200 OK message, the client 110 requests the server 120 to reproduce the streaming data of the time $T_1$ and receives video data corresponding to the time $T_1$ in response to the request, in operation 810. The video data corresponding to the time $T_1$ may be video data about the initial thumbnail image 720 from among the thumbnail images 720 through 724 displayed on the screen 700 with the main screen 710 of FIG. 7. If the time $T_1$ is different from a random access time of the streaming data, the video data received in operation 810 may be video data corresponding to the random access time near to the time $T_1$.

When the video data corresponding to the time $T_1$ is received in operation 810, the client 110 requests the server 120 to pause the reproduction in operation 820, and requests the server 120 to reproduce the streaming data of a following time, i.e., the time $T_2$, and receives video data corresponding to the time $T_2$ in response to the request in operation 830. The video data corresponding to the time $T_2$ may be video data about the second thumbnail image 720 from among the thumbnail images 720 through 724 displayed on the screen 700 of FIG. 7. Like the time $T_1$, when the time $T_2$ is different from the random access time of the streaming data, the video data received in operation 830 may be video data corresponding to the random access time near to the time $T_2$.

By repeating operations 810 through 830 up to the time $T_n$, thumbnail images about the streaming data may be received at predetermined time intervals.

Figure 9:
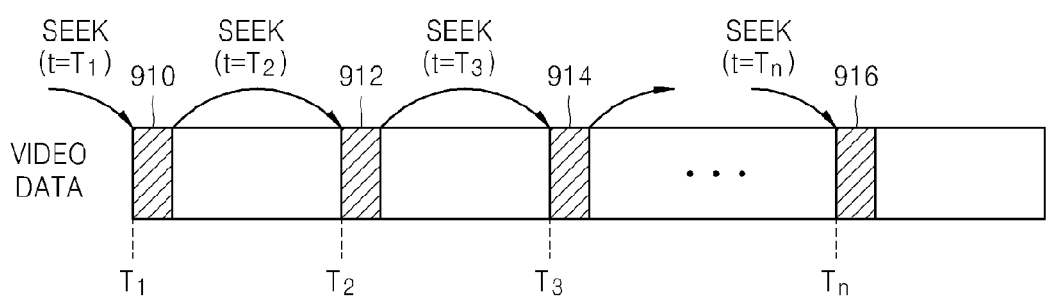
FIG. 9 is a diagram for describing a method of receiving a thumbnail image, according to an exemplary embodiment.

FIG. 9 is a diagram illustrating a method of receiving a thumbnail image, according to an exemplary embodiment.

Referring to FIG. 9, the client 110 may quickly receive the thumbnail image regardless of reproduction of streaming data by repeatedly reproducing the streaming data through an RTSP session for reproducing the streaming data while seeking video data at predetermined time intervals through a separately established RTSP session for receiving the thumbnail image. The client 110 may seek key frames 910 through 916, such as I image frames, at predetermined time intervals, and receive only video data about the key frames 910 through 916 through the separately established RTSP session.

Figure 10:
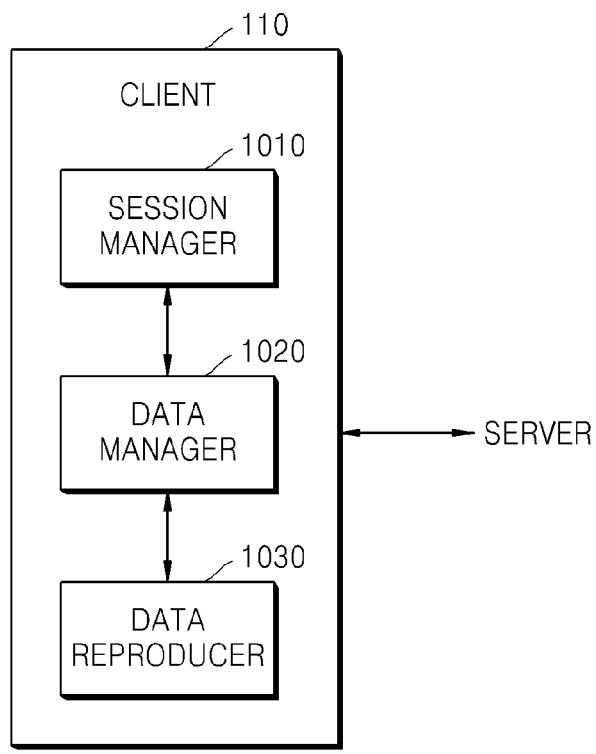
FIG. 10 is a block diagram of an apparatus for receiving streaming data of a client, according to an exemplary embodiment.

FIG. 10 is a block diagram of an apparatus for receiving streaming data of the client 110, according to an exemplary embodiment.

Referring to FIG. 10, the apparatus includes a session manager 1010, a data manager 1020, and a data reproducer 1030.

The session manager 1010 establishes a plurality of RTSP sessions for receiving one piece of streaming data, i.e., streaming data related to one item of content. Also, the session manager 1010 requests the server 120 to transmit the streaming data through the established RTSP sessions. The session manager 1010 receives a description about the streaming data generated according to an SDP through one RTSP session, and establishes the plurality of RTSP sessions for receiving the streaming data based on the received description.

The session manager 1010 determines a number of RTSP sessions to be established while considering network characteristics, such as a type of a network or a transmission speed between the client 110 and the server 120, and establishes the determined number of RTSP sessions. When the RTSP sessions are established for quick buffering during initial reproduction of the streaming data, the number of the RTSP sessions may be determined while considering a buffering time.

As described with reference to FIGS. 2A through 4, the session manager 1010 may establish the RTSP sessions for receiving different parts of the streaming data, and request the server 120 to transmit the streaming data by setting up a plurality of reproduction starting times, such as the times $T_1$ through $T_n$, through the established RTSP sessions.

As described with reference to FIG. 4, request ranges #1 through #n requested by the session manager 1010 may be different from streaming ranges #1 through #n actually received by the data manager 1020.

Also, the session manager 1010 may end the RTSP sessions based on a starting time of the streaming ranges #1 through #n received through the RTSP sessions, i.e., the times $T_{act1}$ through $T_{actn}$. As described with reference to FIG. 4, the RTSP session #1 receiving the streaming data that starts at the time $T_{act1}$ may be ended at the time $T_{act2}$ that is a following random access time, and the RTSP session #2 receiving the streaming data that starts at the time $T_{act2}$ may be ended at the time $T_{act3}$ that is a following random access time. The session manager 1010 repeats the ending of the RTSP sessions, thereby preventing the inefficiency of repeatedly receiving the streaming data through the RTSP sessions.

When the plurality of RTSP sessions are used to quickly perform buffering during the initial reproduction of the streaming data, n–1 RTSP sessions for receiving the streaming ranges #1 to #n–1 included in a time $T_{buffer}$ may be all ended, and only an RTSP session for receiving the streaming range #n may be continuously maintained.

As described with reference to FIGS. 5A through 6, the session manager 1010 may establish the plurality of RTSP sessions for reproducing the streaming data at a multiple-speed, and request parts of the streaming data corresponding to different I image frames through the established RTSP sessions. The parts of the streaming data corresponding to the I image frames in the predetermined request cycle 620 are requested through the RTSP sessions, and the parts of the streaming data are received through the session manager 1010. Then, I image frames of a next request cycle (from the time $T_{n+1}$ to the time $T_{2n}$) are requested again through the RTSP sessions.

As described with reference to FIGS. 7 through 9, the session manager 1010 may establish an RTSP session for reproducing one piece of streaming data, and an RTSP session for receiving a thumbnail image. Transmission of the streaming data may be requested through the RTSP session for reproducing one piece of streaming data while searching of the thumbnail image is requested through the RTSP session for receiving a thumbnail image.

The client 110 repeatedly requests the server 120 to pause and reproduce the streaming data through the RTSP session for receiving a thumbnail image, thereby receiving the parts of the streaming data about the thumbnail image.

The data manager 1020 receives the streaming data transmitted by the server 120 based on the request of the session manager 1010, through the RTSP sessions established by the session manager 1010.

As described with reference to FIGS. 2A through 4, the data manager 1020 may receive the different parts of the streaming data through the RTSP sessions. The received different parts of the streaming data may be the plurality of streaming ranges #1 through #n as shown in FIG. 4, wherein the streaming ranges #1 through #n may be different from the request ranges #1 through #n requested by setting up the reproduction starting times in the session manager 1010.

Also, the data manger 1020 may enable the data reproducer to continuously reproduce the streaming data by adjusting and storing timestamps and sequence numbers of the different parts of the streaming data received through the RTSP sessions in a buffer.

As described with reference to FIGS. 5A through 6, the data manager 1020 may receive the parts of the streaming data corresponding to different I image frames of one piece of streaming data through the RTSP sessions. The parts of the streaming data are repeatedly received at a predetermined cycle interval.

Here, the received I image frames may be overlapped. For example, referring to FIG. 5B, the I image frame of the time $T_1$ requested and received through the RTSP session #1 and the I image frame of the time $T_2$ requested and received through the RTSP session #2 may be overlapped.

When the session manager 1010 requests an I image frame, an accurate random access time of the I image frame is not known. Accordingly, when the I image frame of the time $T_1$ is requested, the server 120 transmits the streaming data corresponding to the I image frame of a random access time near to the time $T_1$, and when the I image frame of the time $T_2$ is requested, the server 120 transmits the streaming data corresponding to the I image frame of a random access time near to the time $T_2$.

Here, if the random access time near to the time $T_1$ is identical to the random access time near to the time $T_2$, the parts of the streaming data corresponding to the same I image frame are simultaneously received through the RTSP sessions #1 and #2. Accordingly, the data manager 1020 compares the I image frames received through each RTSP session to determine whether the I image frames have the same random access time, and if the I image frames have the same random access time, discards the part of the streaming data corresponding to the repeatedly received I image frame.

As described with reference to FIGS. 7 through 9, the data manager 1020 may receive thumbnail images through the separately established RTSP session for receiving a thumbnail image. Like the I image frames received for multiple-speed reproduction, the thumbnail images may also be repeatedly received.

For example, referring to FIG. 8, the thumbnail image of the time $T_1$ and the thumbnail image of the time $T_2$, which were requested and received, may be overlapped. Since an accurate time of the I image frame is not known when the session manager 1010 requests the I image frame, the server 120 transmits the streaming data corresponding to the I image frame of the random access time near to the time $T_1$, and the streaming data corresponding to the I image frame of the random access time near to the time $T_2$ to the client 120.

Here, if the random access time near to the time $T_1$ is identical to the random access time near to the time $T_2$, the streaming data corresponding to the same I image frame are repeatedly received. Accordingly, the data manager 1020 compares a time of a current thumbnail image and the time of a previously received thumbnail image, which are received through the separately established RTSP session, and if the time of the previously received thumbnail image and the time of the current thumbnail image are the same, discards the current thumbnail image without displaying it to a user.

The data reproducer 1030 reproduces the streaming data received by the data manager 1020. The data manager 1020 may consecutively reproduce the different parts of the streaming data. Here, the different parts of the streaming data may be received from the server 120 for quick buffering during initial reproduction of the streaming data, or may correspond to the plurality of I image frames received from the server 120 for multiple-speed reproduction. Also, the data reproducer 1030 may display the thumbnail images received through the separately established RTSP sessions as parts of the thumbnail images 720 through 724 on the screen 700 of FIG. 7.

Figure 11:
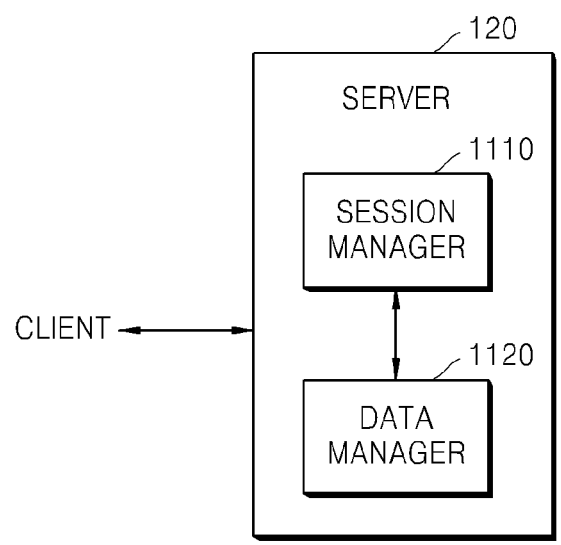
FIG. 11 is a block diagram of an apparatus for transmitting streaming data of a server, according to an exemplary embodiment.

FIG. 11 is a block diagram of an apparatus for transmitting streaming data of the server 120, according to an exemplary embodiment.

Referring to FIG. 11, the apparatus includes a session manager 1110 and a data manager 1120.

The session manager 1110 receives a DESCRIBE message from the client 110, and provides a description about the streaming data generated according to an SDP to the client 110 in response to the DESCRIBE message. Also, when the client 110 requests to set up a plurality of RTSP sessions based on the description, the session manager 1110 transmits a 200 OK message in response to the request so as to establish the plurality of RTSP sessions.

The data manager 1120 receives a request to transmit the streaming data from the client 110 through the RTSP sessions, and transmits the streaming data in response to the request. Different parts of the streaming data may be transmitted, or a thumbnail image requested by the client 110 may be transmitted while reproducing the streaming data. The different parts of the streaming data may be requested by the client 110 for quick buffering during initial reproduction of the streaming data, or may correspond to different I image frames requested by the client 110 for multiple-speed reproduction.

Figure 12:
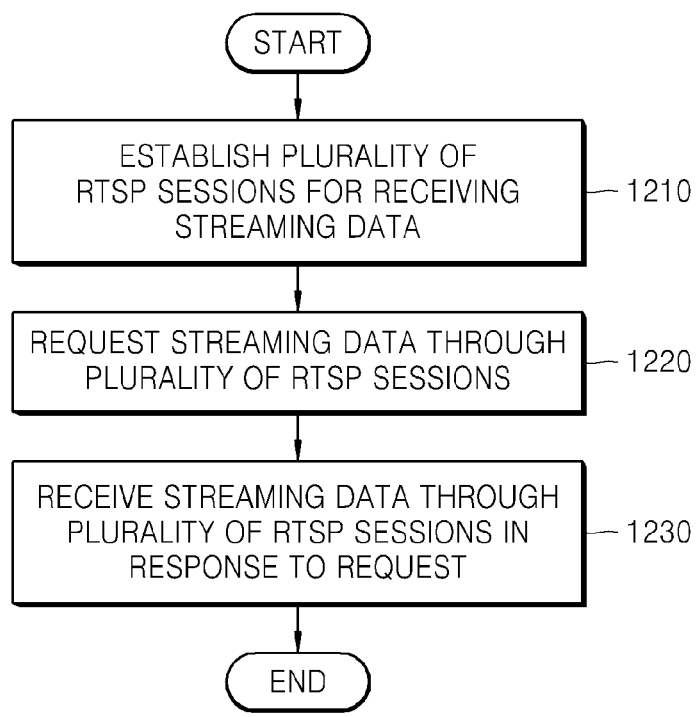
FIG. 12 is a flowchart illustrating a method of receiving streaming data, according to an exemplary embodiment.

FIG. 12 is a flowchart illustrating a method of receiving streaming data, according to an exemplary embodiment.

Referring to FIG. 12, the client 110 establishes a plurality of RTSP sessions for receiving one piece of streaming data, i.e., streaming data related to one item of content, in operation 1210. As described with reference to FIG. 2A, a DESCRIBE message is transmitted to the server 120 through one RTSP session, and a description about the streaming data generated according to an SDP is received in response to the DESCRIBE message. Then, the plurality of RTSP sessions are set up based on the received description.

The client 110 requests the streaming data through the established RTSP sessions, in operation 1220. Different parts of the streaming data may be requested, or the streaming data may be reproduced while requesting a thumbnail image. The requesting of the streaming data through the plurality of RTSP sessions has been described above with reference to FIGS. 1 through 9.

In operation 1230, the client 110 receives the streaming data through the plurality of RTSP sessions in response to the request in operation 1220. The different parts of the streaming data may be received for quick buffering during initial reproduction or for multiple-speed reproduction. Alternatively, the streaming data may be reproduced while receiving the thumbnail images from the server 120. The receiving of the streaming data through the plurality of RTSP sessions have also been described with reference to FIGS. 1 through 9.

According to the exemplary embodiment, streaming data is transmitted and received at the same time through a plurality of RTSP sessions, and thus time consumed in buffering during initial reproduction of the streaming data may be reduced or the streaming data may be reproduced at a multiple-speed. Also, since thumbnail images related to the streaming data are quickly received, quality of service (QoS) of the streaming may be remarkably improved.

While the inventive concept has been particularly shown and described with reference to exemplary embodiments thereof, it will be understood by those of ordinary skill in the art that various changes in form and details may be made therein without departing from the spirit and scope of the present invention as defined by the following claims. The exemplary embodiments can be embodied as computer readable codes on a computer readable recording medium.

For example, a client and a server according to exemplary embodiments may include a bus coupled to each unit of the apparatuses of FIGS. 10 and 11, and at least one processor connected to the bus. Also, the client and the server may include a memory coupled to the at least one processor that is connected to the bus to perform a command, so as to store a command, a received message, or a generated message.

The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributed fashion.

What is claimed is:

1. A method of receiving streaming data from a server, wherein the method is performed by a client, the method comprising:

establishing a plurality of real-time streaming protocol (RTSP) sessions for receiving the streaming data;

requesting transmission of the streaming data through the plurality of RTSP sessions by setting a plurality of reproduction starting times which are within a predetermined range from an initial reproduction starting time of the streaming data; and receiving the streaming data through the plurality of RTSP sessions in response to the request.

2. The method of claim 1, wherein the plurality of RTSP sessions receive different parts of the streaming data.

3. The method of claim 1, wherein the receiving comprises receiving parts of the streaming data that are classified according to a plurality of random access times each corresponding to the plurality of reproduction starting times.

4. The method of claim 3, wherein an RTSP session for receiving a part of the streaming data that starts at a first random access time from among the parts of the streaming data that are classified according to the plurality of random access times ends at a second random access time following the first random access time.

5. The method of claim 3, wherein the plurality of random access times correspond to a random accessible video frame or audio frame.

6. The method of claim 3, further comprising adjusting timestamps and real-time transport protocol (RTP) sequence numbers of the parts of the streaming data that are classified according to the plurality of random access times to consecutive timestamps and RTP sequence numbers.

7. The method of claim 2, wherein the requesting comprises requesting transmission of parts of the streaming data corresponding to intra image frames (I image frames) having different random access times.

8. The method of claim 7, wherein the I image frames having different random access times have predetermined time intervals.

9. The method of claim 8, wherein the receiving comprises receiving parts of the streaming data pertaining to I image frames having different random access times each corresponding to the different times in the predetermined time intervals.

10. The method of claim 2, wherein the requesting comprises repeatedly requesting transmission of parts of the streaming data pertaining to I image frames having different times according to a predetermined requesting cycle.

11. The method of claim 1, wherein the plurality of RTSP sessions comprise a session for reproducing the streaming data, and a session for seeking a plurality of frames of the streaming data in a predetermined time interval.

12. The method of claim 1, wherein at least one thumbnail image of the streaming data is received at predetermined periods through at least one of the plurality of RTSP sessions.

13. An apparatus for receiving streaming data from a server, wherein the apparatus is included in a client, the apparatus comprising:

a session manager which establishes a plurality of real-time streaming protocol (RTSP) sessions for receiving the streaming data, and requests transmission of the streaming data through the plurality of RTSP sessions by setting a plurality of reproduction starting times which are within a predetermined time range from an initial reproduction starting time of the streaming data; and a data manager which receives the streaming data through the plurality of RTSP sessions in response to the request.

14. The apparatus of claim 13, wherein the plurality of RTSP sessions are for receiving different parts of the streaming data.

15. The apparatus of claim 13, wherein the data manager receives parts of the streaming data that are classified according to a plurality of random access times each corresponding to the plurality of reproduction starting times.

16. The apparatus of claim 15, wherein an RTSP session for receiving a part of the streaming data that starts at a first random access time from among the parts of the streaming data that are classified according to the plurality of random access times ends at a second random access time following the first random access time.

17. The apparatus of claim 13, wherein the plurality of random access times correspond to a random accessible video frame or audio frame.

18. The apparatus of claim 15, wherein the data manager adjusts timestamps and real-time transport protocol (RTP) sequence numbers of the parts of the streaming data that are classified according to the plurality of random access times in consecutive timestamps and RTP sequence numbers.

19. The apparatus of claim 14, wherein the session manager requests transmission of parts of the streaming data corresponding to intra image frames (I image frames) having different random access times.

20. The apparatus of claim 19, wherein the I image frames having different random access times have predetermined time intervals.

21. The apparatus of claim 20, wherein the data manager receives parts of the streaming data pertaining to I image frames having different random access times each corresponding to the different times in the predetermined time intervals.

22. The apparatus of claim 14, wherein the session manager repeatedly requests transmission of parts of the streaming data pertaining to I image frames having different times according to a predetermined requesting cycle.

23. The apparatus of claim 13, wherein the plurality of RTSP sessions comprise a session for reproducing the streaming data, and a session for seeking a plurality of frames of the streaming data in a predetermined time interval.

24. A non-transitory computer readable recording medium having embodied thereon a program for executing a method of receiving streaming data from a server, wherein the method is performed by a client, the method comprising:
- establishing a plurality of real-time streaming protocol (RTSP) sessions for receiving the streaming data;
- requesting transmission of the streaming data through the plurality of RTSP sessions by setting a plurality of reproduction starting times which are within a predetermined range from an initial reproduction starting time of the streaming data; and
- receiving the streaming data through the plurality of RTSP sessions in response to the request.

* * * * *